Oct. 3, 1933.  A. F. MARCIL  1,929,026
CHAIN TIGHTENING DEVICE
Filed Nov. 28, 1930
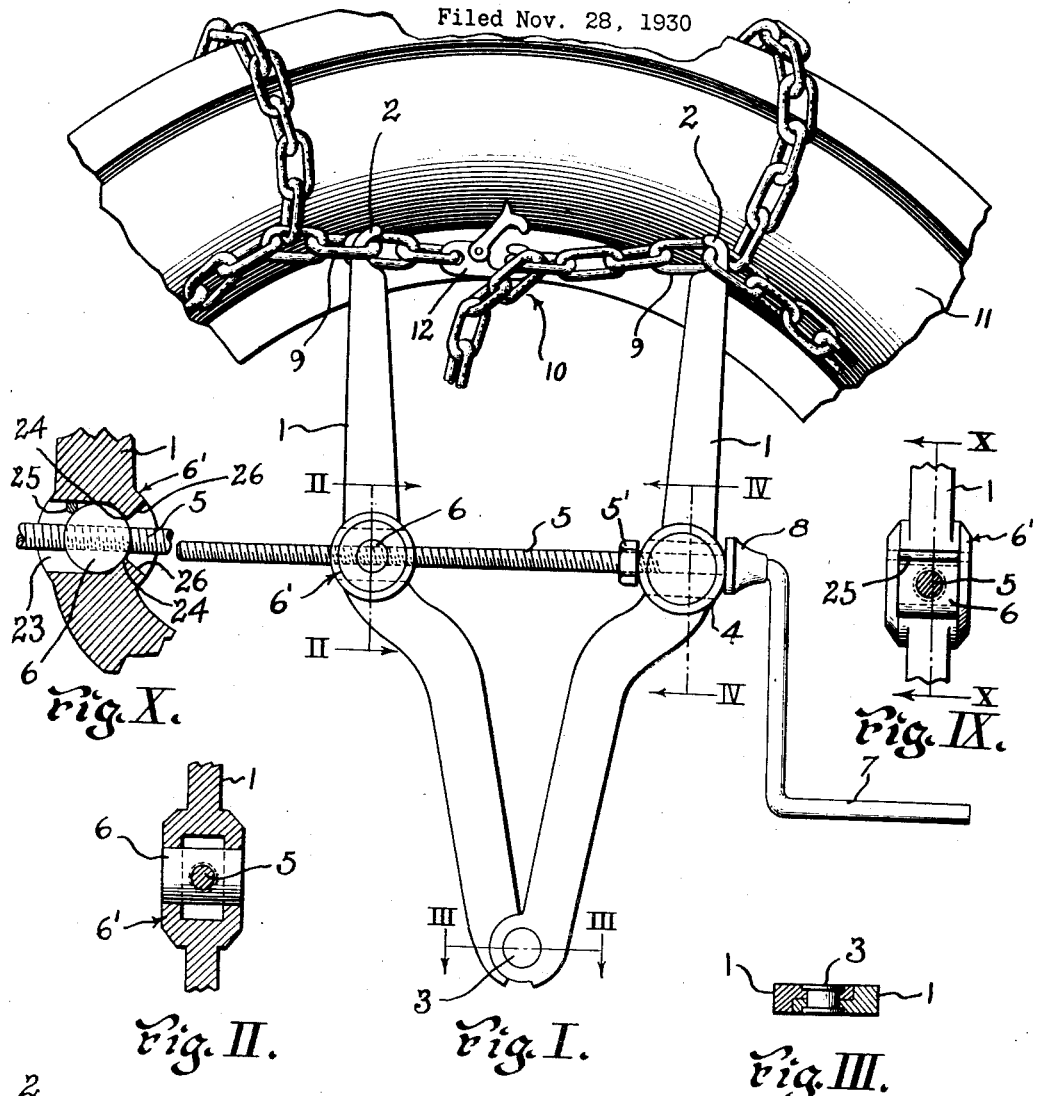
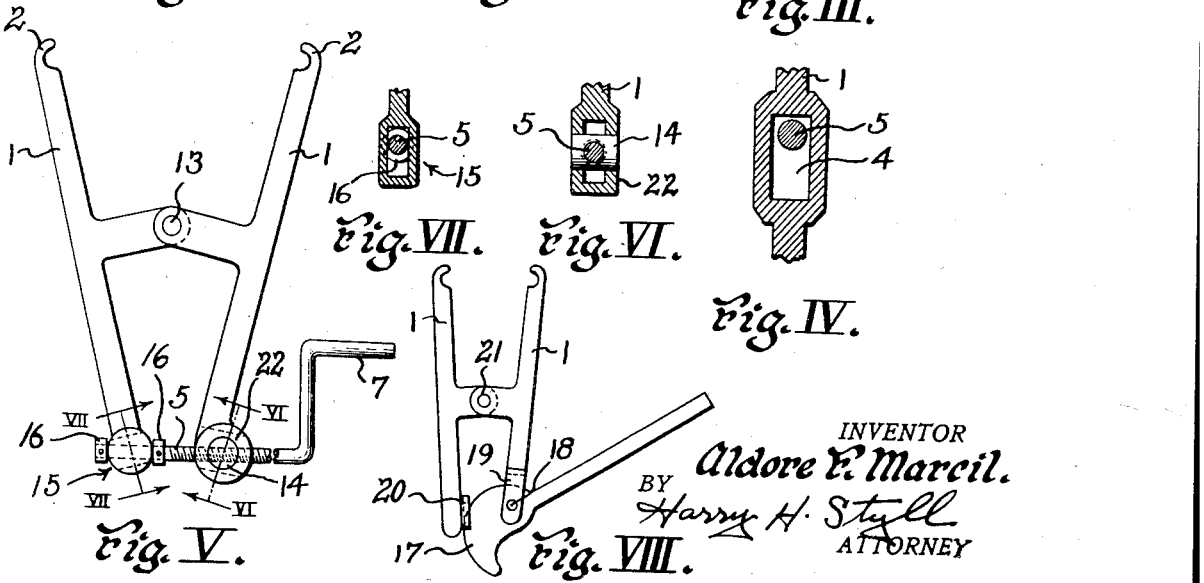
INVENTOR
Aldore F. Marcil.
BY Harry H. Stull
ATTORNEY Patented Oct. 3, 1933

1,929,026

UNITED STATES PATENT OFFICE 1,929,026

CHAIN TIGHTENING DEVICE

Aldore F. Marcil, Woonsocket, R. I.

Application November 28, 1930
Serial No. 498,787

3 Claims. (Cl. 254—78)

This invention relates to improvements in tightening devices and has particular reference to improved means and method of taking up the looseness and play in chains.

The principal object of the invention is to provide improved means and method of drawing the connecting ends of a chain together to take up the looseness and play in said chain.

Another object of the invention is to provide improved means and method whereby a non-skid or like chain may be rigidly secured to the tire of an automobile or like vehicle.

Another object is to provide improved means and method of drawing a non-skid or like chain taut upon the wheel so that the connecting means adjacent the ends of said chain may be easily united.

Another object is to provide simple, efficient and economical means and method of applying a non-skid or like chain to the wheel of an automobile or like vehicle.

Other objects and advantages of the invention will be apparent from the following description taken in connection with the accompanying drawing and it will be understood that many changes may be made in the details of construction, arrangements of parts and method shown without departing from the spirit of the invention as expressed in the accompanying claims. I, therefore, do not wish to be limited to the exact details of construction, arrangements of parts and method shown as the preferred forms only have been shown by way of illustration.

Referring to the drawing:

Fig. I is a side elevation of the device embodying the invention showing a portion of a tire and non-skid chain thereon and illustrating the use of the device in applying the chain.

Fig. II is an enlarged fragmentary sectional view taken on line II—II of Fig. I;

Fig. III is a sectional view taken on line III—III of Fig. I;

Fig. IV is an enlarged fragmentary sectional view taken on line IV—IV of Fig. I;

Fig. V is a side elevation of a modified form of the invention;

Fig. VI is a fragmentary sectional view on line VI—VI of Fig. V;

Fig. VII is a fragmentary sectional view on line VII—VII of Fig. V;

Fig. VIII is a side elevation of another modified form of the invention;

Fig. IX is a fragmentary view similar to Fig. II showing a modified form of pivot connection, the parts being shown in full lines; and Fig. X is a sectional view taken on line X—X of Fig. IX.

In the past it was believed that a non-skid chain should be loosely applied to a wheel so that the said chain would whip forward when the wheel was in motion and form a tread ahead of the tire to prevent skidding. This practice, however has proven very unreliable and unsatisfactory as the looseness did not only retard the gripping function of the chain when the wheel skidded but also caused the links to knot and break or wear away quickly when run over by the wheel. This looseness in many instances in the past has been the cause of many serious accidents. It also permitted the chain to whip against the mud guards and wear holes therethrough and made such invidious noises that the said chains were very undesirable for use.

It, therefore, is the prime object of this invention to provide improved means and method of tightening the chain upon the wheel to overcome the above disadvantages and permit the said chain to function quickly.

Referring to the drawing wherein like characters of reference designate like parts throughout the several views the device embodying the invention comprises a pair of arms 1 having a hook shaped portion 2 adjacent one end thereof and having their opposite ends pivotally secured together at 3. One of the arms 1 is provided with an enlarged cut out portion 4 intermediate its ends through which a threaded rod member 5 extends. The threaded rod 5 is threadedly connected to a pivot lug 6 mounted in an enlarged cut out portion 6' formed on the other arm 1 and is provided with a crank portion 7 and an enlarged shouldered portion 8 adapted to engage the side of the arm adjacent the cut out portion 4 to force the said arm toward the other when the crank portion 7 is operated to thread the threaded rod 5 into the pivot lug 6. A nut member 5' on the rod 5 adjacent the inner side of the cut out portion 4 causes the arm 1 to move outwardly when the rod member 5 is threaded outwardly of the pivot lug 6. The hook shaped ends 2 are adapted to be placed within the link members 9 of a nonskid chain 10 as shown in Fig. I to hold the said chain so that it may be tightened. The chain 10 is shown applied to a tire 11 of an automobile or like vehicle.

The operation of the device is as follows:

The chain 10 is applied to the tire 11 in the usual manner. The arms 1 are opened outwardly and the hook shaped ends 2 are placed within the links 9 of the chain. The crank member 7 is then operated to move the hook shaped ends 2 towards each other and draw the chain tight upon the tire 11. The connecting member 12 on the chain 10 is then attached to one of the links 9 and the crank member 7 is again operated to open the arms 1 outwardly and release the hook shaped ends 2 from the chain. The chain in this manner can be rigidly secured to the tire. Attention is called to the fact that there is ample room between the arms 1 when the chain is drawn taut to permit the connecting member 12 to be easily inserted in one of the link members 9.

In Fig. V there is shown a slight modification in which the arms 1 are pivotally connected at 13 intermediate their ends. The threaded rod 5 of the crank member 7 in this instance is placed at the ends of the arms 1 opposite the hook shaped ends 2 and is threaded into a pivot lug 14 mounted in an enlarged cut out portion 22 adjacent the end of one arm and is loosely attached at its end opposite the crank portion 7' in the enlarged recessed end 15 of the other arm.

A pair of collars 16, one on each side of the recessed end 15 loosely secures the end of the rod member in place in said end and permits the crank member 7 to be operated to move the hook shaped ends toward and away from each other.

In Fig. VIII there is shown a further modification wherein instead of using a crank member 7 as shown in Fig. V a cam member 17 is employed. The cam member 17 is pivotally connected at 18 to the bifurcated end 19 of one of the arms 1 and engages with a grooved faced member 20 adjacent the end of the other arm. The arms in this instance are pivotally connected at 21 intermediate their ends as shown in Fig. V.

The operation of both of the modified forms is similar to that of the preferred form set forth above.

A further modification of the invention is shown in Figs. IX and X wherein instead of placing the pivot lug 6 in aligned transverse openings as shown in Figs. I and II the enlarged portion 6' is formed with a cut out central portion which is so dimensioned that a mouth 23 is provided on one side thereof in which the lug 6 may be dropped in place within the enlarged portion 6'. The said cut out central portion is provided on the side opposite the mouth with converging projections 24 which form stops to hold the lug 6 in place. A pin member 25 holds the lug 6 against the stops 24 within the cut out portion and prevents displacement thereof during the use of the device. This construction is such that the cut out portion and projections 24 may be formed in the arm when it is casted and thereby greatly reduces the cost of manufacture. The converging projections 24 are angled at 26 to provide clearance for angle movement of the threaded rod member 5.

This improved method of applying non-skid chains prevents the usual side skidding of the wheels until the chains become taut as has been true in the past and prevents undue wearing of the chains and mud guards during the use of said chains and also obviates obnoxious noises such as has been caused by the loose chains of the past.

From the foregoing description it will be seen that I have provided simple, efficient and economical means and method of obtaining all the objects of the invention.

Having described my invention I claim:

1. A chain tightening device comprising a pair of arms having a holding portion adjacent one end thereof, a pivotal connection adjacent the other end and a cut out portion intermediate their ends, one of said cut out portions having substantially straight parallel upper and lower walls which converge inwardly on one side thereof to form stops, a perforated pivot member in the cut out portion in engagement with the stops, the perforation in said pivot member having a threaded bore, a pin extending transversely of the cut out portion on the side of the pivot member opposite the stops for holding the pivot member against the stops in said cut out portion, and a crank member having a threaded rod portion extending through the cut out portion in other of said arms and threadedly connected with the pivot member in the cut out portion in the first mentioned arm for moving the said holding portions towards and away from each other by threading the threaded rod in and out of the threaded pivot member, said crank member having an enlarged portion adjacent the cut out portion in the arm adapted to engage the side of the said arm and force it towards the other arm when the crank member is operated.

2. A chain tightening device comprising a pair of arms having a holding portion adjacent one end thereof, a pivotal connection joining the arms to permit movement of the holding portions toward and away from each other, each of said arms having a cut out portion, one of said cut out portions having converging walls forming stops adjacent one end thereof, a perforated pivot member in the cut out portion in engagement with the stops, said pivot member having a threaded bore, a pin extending transversely of the cut out portion on the side of the pivot member opposite the stops for holding the pivot member against the stops in said cut out portion, and a crank member having a threaded portion extending through the cut out portion in the other of said arms and threadedly connected with the pivot member in the cut out portion in the first mentioned arm for moving the said holding portions toward and away from each other by threading the threaded portion in and out of the threaded pivot member, said crank member having an enlarged portion adjacent the cut out portion in the arm through which it extends, adapted to engage the side of the said arm and force it toward the other arm when the crank member is operated.

3. A chain tightening device comprising a pair of arms having a holding portion adjacent one end thereof, a pivotal connection joining the arms to permit movement of the holding members toward and away from each other, each of said arms having a cut out portion, one of said cut out portions having an opening extending transversely thereof, a pivot member in the transverse opening having a threaded opening intermediate its ends lying within the cut out portion, and means having a threaded portion extending through the cut out portion in the other of said arms and threadedly connected with the pivot member in the transverse opening in the cut out portion in the first mentioned arm for moving the said holding portions toward and away from each other by threading the threaded member in and out of the threaded pivot member, said threaded pivot member being adapted to be held in the transverse opening by said threaded member and forming pivot means for connecting the said threaded member to the arm, said threaded member having an enlarged portion adjacent the cut out portion in the arm through which it extends adapted to engage the side of said arm and force it toward the other arm when the member having the threaded member thereon is operated.

ALDORE F. MARCIL.